United States Patent
Archer et al.

(10) Patent No.: US 7,944,842 B2
(45) Date of Patent: May 17, 2011

(54) OPPORTUNISTIC QUEUEING INJECTION STRATEGY FOR NETWORK LOAD BALANCING

(75) Inventors: Charles J. Archer, Rochester, MN (US); Michael A. Blocksome, Rochester, MN (US); Joseph D. Ratterman, Rochester, MN (US); Brian E. Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 372 days.

(21) Appl. No.: 11/738,034

(22) Filed: Apr. 20, 2007

(65) Prior Publication Data

US 2008/0259916 A1 Oct. 23, 2008

(51) Int. Cl.
*H04L 12/26* (2006.01)
(52) U.S. Cl. ........ 370/238; 370/237; 370/406; 709/235; 709/239
(58) Field of Classification Search .......................... None
See application file for complete search history.

(56) References Cited

U.S. PATENT DOCUMENTS

| | | | | |
|---|---|---|---|---|
| 5,353,412 A | * | 10/1994 | Douglas et al. | 709/243 |
| 5,485,474 A | * | 1/1996 | Rabin | 714/762 |
| 5,878,227 A | * | 3/1999 | Wade et al. | 709/235 |
| 6,603,625 B1 | * | 8/2003 | Hospodor et al. | 360/73.02 |
| 2004/0103218 A1 | * | 5/2004 | Blumrich et al. | 709/249 |
| 2007/0140240 A1 | * | 6/2007 | Dally et al. | 370/389 |
| 2007/0294581 A1 | * | 12/2007 | Dean et al. | 714/33 |

OTHER PUBLICATIONS

"Design and Implementation of a One-Sided Communication Interface for the IBM eServer Blue Gene Supercomputer", http://sc06.supercomputing.org/techprogram/papers.php/, publicly available Aug. 2006.

* cited by examiner

*Primary Examiner* — Nittaya Juntima
*Assistant Examiner* — Tito Pham
(74) *Attorney, Agent, or Firm* — Patterson & Sheridan, LLP

(57) ABSTRACT

Embodiments of the invention include a method, system, and article of manufacture that provide opportunistic queuing injection strategy used for data communication between nodes of a parallel computer system. A message may be encapsulated into a set of data packets. When the packets are sent, an opportunistic injection queue may be configured to transmit them to multiple hardware injection ports. This approach allows for complete network link saturation. In a parallel system with network links in multiple dimensions, sending message packets using more than one dimension may substantially increase network throughput.

21 Claims, 6 Drawing Sheets

US 7,944,842 B2

OPPORTUNISTIC QUEUEING INJECTION STRATEGY FOR NETWORK LOAD BALANCING

BACKGROUND OF THE INVENTION

1. Field of the Invention

The present invention generally relates to data processing and more particularly to a queuing injection strategy in a parallel computing system.

2. Description of the Related Art

Powerful computers may be designed as highly parallel systems where the processing activity of hundreds, if not thousands, of processors (CPUs) are coordinated to perform computing tasks. These systems are highly useful for a broad variety of applications including, financial modeling, hydrodynamics, quantum chemistry, astronomy, weather modeling and prediction, geological modeling, prime number factoring, image processing (e.g., CGI animations and rendering), to name but a few examples.

For example, one family of parallel computing systems has been (and continues to be) developed by International Business Machines (IBM) under the name Blue Gene®. The Blue Gene/L architecture provides a scalable, parallel computer that may be configured with a maximum of 65,536 ($2^{16}$) compute nodes. Each compute node includes a single application specific integrated circuit (ASIC) with 2 CPU's and memory. The Blue Gene/L architecture has been successful and on Oct. 27, 2005, IBM announced that a Blue Gene/L system had reached an operational speed of 280.6 teraflops (280.6 trillion floating-point operations per second), making it the fastest computer in the world at that time. Further, as of June 2005, Blue Gene/L installations at various sites worldwide were among five out of the ten top most powerful computers in the world.

IBM is currently developing a successor to the Blue Gene/L system, named Blue Gene/P. Blue Gene/P is expected to be the first computer system to operate at a sustained 1 petaflops (1 quadrillion floating-point operations per second). Like the Blue Gene/L system, the Blue Gene/P system is scalable with a projected maximum of 73,728 compute nodes. Each compute node in Blue Gene/P is projected to include a single application specific integrated circuit (ASIC) with 4 CPU's and memory. A complete Blue Gene/P system is projected to include 72 racks with 32 node boards per rack.

In addition to the Blue Gene architecture developed by IBM, other highly parallel computer systems have been (and are being) developed. For example, a Beowulf cluster may be built from a collection of commodity off-the-shelf personal computers. In a Beowulf cluster, individual computer systems are connected using local area network technology (e.g., Ethernet) and system software is used to execute programs written for parallel processing on the cluster.

The compute nodes in a parallel system communicate with one another over one or more communication networks. For example, the compute nodes of a Blue Gene/L system are interconnected using five specialized networks. The primary communication strategy for the Blue Gene/L system is message passing over a torus network (i.e., a set of point-to-point links between pairs of nodes). The torus network allows application programs developed for parallel processing systems to use high level interfaces such as Message Passing Interface (MPI) and Aggregate Remote Memory Copy Interface (ARMCI) to perform computing tasks and to distribute data among a set of compute nodes. Other parallel architectures (e.g., a Beowulf cluster) also use MPI and ARMCI for data communication between compute nodes. Of course, other message passing interfaces have been (and are being) developed. Low level network interfaces communicate higher level messages using small messages known as packets. Typically, MPI messages are encapsulated in a set of packets which are transmitted from a source node to a destination node over a communications network (e.g., the torus network of a Blue Gene system).

A "message passing protocol" is a set of instructions specifying how to create a set of packets from a message and how to reconstruct the message from a packet stream. Message passing protocols may be used to transmit packets in different ways depending on the desired communication characteristics. In a parallel system where a compute node has multiple communication links to other nodes, each compute node can send a point-to-point message to any other node. Typically, packets injected onto the network generally follow one of two types of routing, adaptive or deterministic.

"Adaptive routing" is used where a routing decision is made by the network hardware at each hop in the network, causing packets to travel down the least congested network. Packets may arrive at the destination out-of-order if one path is less congested than another. Another source of out-of-order delivery is from packets being injected into the network using multiple injection queues. As is known, multiple injection queues may drain packets onto the network at different rates depending on wire congestion from cut through traffic or other network hot spots. If multiple queues are draining packets from the same message, the packets may be injected onto the network out of sequence and, therefore, may arrive at the destination out-of-order, even if the packets each use the same path between compute nodes.

To eliminate the out-of-order delivery, the same software message queue must be used, the same packet queue must be used, and deterministic routing must be used. In deterministic routing, the path between any two nodes always traverses the same route. For example, for a parallel system linking compute nodes in three dimensions, packets may always be routed in first in an x-dimension, then in a y-dimension, then in a z-dimension. Thus, to send a message from a compute node at position <0, 0, 0> to a compute node at position <5, 5, 5>, packets first traverse the x-plane to <5, 0, 0> then traverse the y-plane to <5, 5, 0>, and finally in the z-plane to the destination of <5, 5, 5>. Using deterministic routing allows packets to be delivered in order. However, achieving in-order delivery is not always desirable because the synchronized/ordered network delivery frequently leads to poor performance. Further, this approach does not effectively use the available communication links often present in a parallel system and deterministic routing cannot avoid any localized network congestion encountered along the static route.

Accordingly, there remains a need for an injection and queuing strategy that takes advantage of a network having multiple communication links or paths, but at the same time preserves higher order message semantics such as in-order processing of message packets.

SUMMARY OF THE INVENTION

Embodiments of the invention provide a message passing protocol that employs an opportunistic queuing injection strategy for network load balancing. One embodiment of the invention is a method of transmitting a message between a sending node and a receiving node of a parallel computing system. The method generally includes encapsulating the message in a set of one or more data packets and transmitting each data packet, of the set of data packets, from an injection queue to one of a plurality of hardware injection ports. Each hardware injection port is associated with a different communication link of the parallel computing system and each communication link of the sending node links that node to other nodes of the parallel computing system in a different network dimension. The method also includes injecting the set of data packets onto the different communication links of the sending node.

Depending on the relative positions of the sending node and the receiving node, the number of network dimensions used to send the message may vary. For example, if the sending node and the receiving node are in the same network plane, and wherein the set of data packets are transmitted from the sending node over communication links in two dimensions, effectively doubling message bandwidth. Similarly, if the sending node and the receiving node are in different network planes, then the set of data packets may be transmitted from the sending node over communication links in three dimensions, effectively tripling network bandwidth.

Another embodiment of the invention includes a computer-readable storage medium containing a program which, when executed, performs an operation of transmitting a message between a sending node and a receiving node of a parallel computing system. The operation generally includes encapsulating the message in a set of one or more data packets and transmitting each data packet, of the set of data packets, from an injection queue to one of a plurality of hardware injection ports. Each hardware injection port is associated with a different communication link of the parallel computing system, and each communication link of the sending node links that node to other nodes of the parallel computing system in a different network dimension. The operation also includes injecting the set of data packets onto the different communication links of the sending node.

Another embodiment of the invention includes a parallel computing system. The system generally includes a plurality of compute nodes, each having at least a processor and a memory, where a sending node, of the plurality of compute nodes, is configured to transmit a message to a receiving node, of the plurality of compute nodes. The sending node may be configured to send the message by generating a message to transmit from a sending node to a receiving node, of the encapsulating the message in a set of one or more data packets and transmitting each data packet, of the set of data packets, from an injection queue to one of a plurality of hardware injection ports. Each hardware injection port is associated with a different communication link of the parallel computing system, and each communication link of the sending node links that node to other nodes of the parallel computing system in a different network dimension. The sending node may be further configured to inject the set of data packets onto the different communication links of the sending node.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
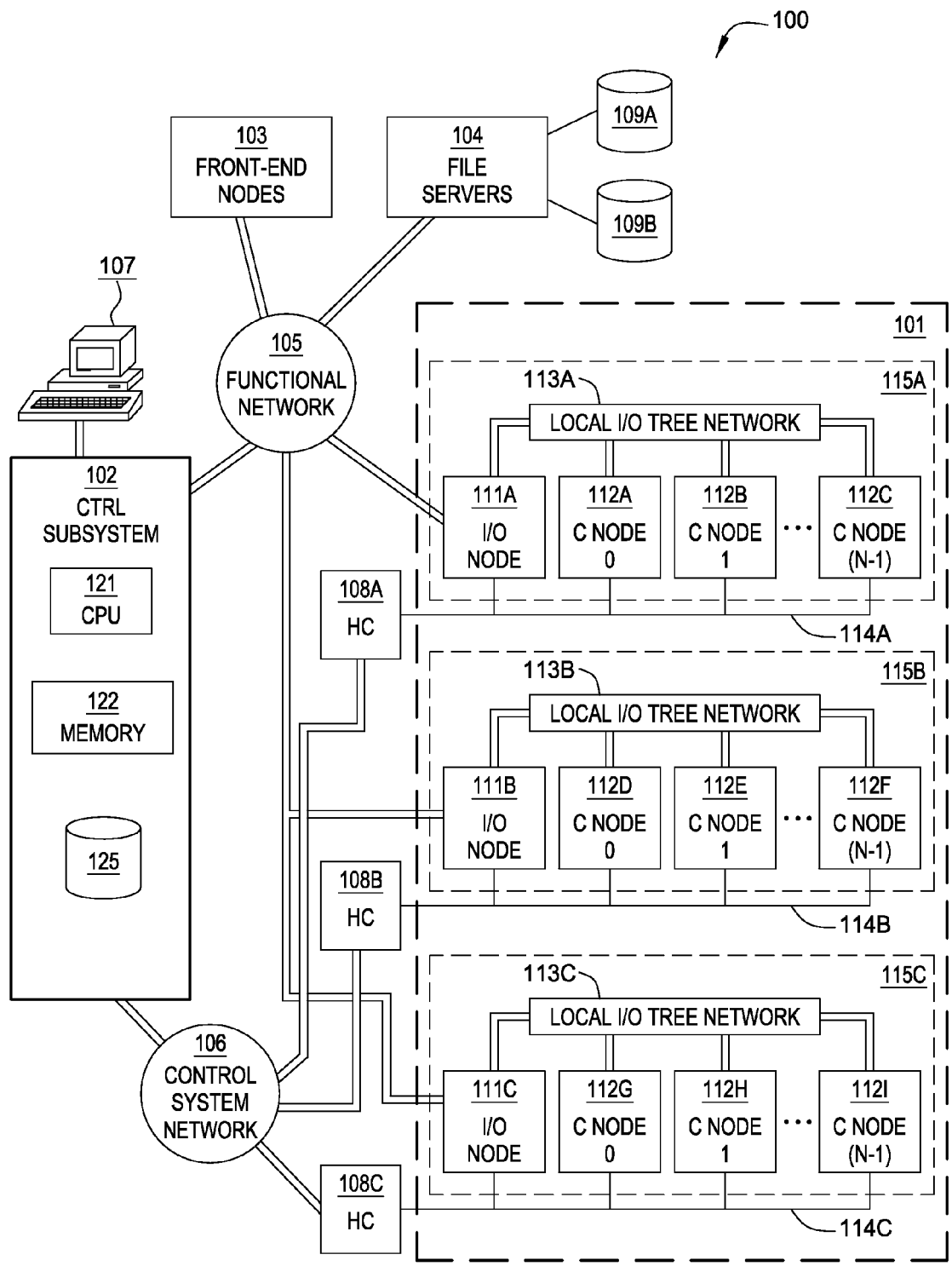
FIG. 1 is a high-level block diagram of components of a massively parallel computer system, according to one embodiment of the present invention.

Embodiments of the invention provide a queuing injection strategy that can simultaneously use multiple communication paths. In one embodiment, a message is broken into two parts, a protocol part, that contains less data payload, but more self describing data, and a data part, which contains packets that can be injected onto a network in any order and arrive at the destination in any order. When the packets are sent, the opportunistic injection queue may be configured to transmit them to multiple hardware injection ports, in any order. Further, the packets may be transmitted onto multiple dimensions of a point-to-point network linking the nodes of the parallel computer system.

This approach allows for complete network link saturation. In a parallel system with multiple network dimensions, sending message packets using each dimension may substantially increase network throughput. For example, to send a message from a node at position <0, 0, 0> to a node at position <5, 5, 5>, message packets may be injected essentially simultaneously on network links in each of the x, y, and z, dimensions. (i.e., from <0, 0, 0> to <0, 0, 1>, to <0, 1, 0>, and to <1, 0, 0>. By deferring message ordering to the message passing protocol, packets may be received out-of-order at the destination and the protocol is responsible for assembling the message. Although this may incur some additional overhead for the receiving node, it is often more then compensated for by the increase in bandwidth achieved by using multiple network dimensions.

In the following, reference is made to embodiments of the invention. However, it should be understood that the invention is not limited to specifically described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s).

Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable media. Illustrative computer-readable media include, but are not limited to: (i) non-writable storage media (e.g., read-only memory devices within a computer such as CD-ROM or DVD-ROM disks readable by a CD- or DVD-ROM drive) on which information is permanently stored; (ii) writable storage media (e.g., floppy disks within a diskette drive or hard-disk drive) on which alterable information is stored. Other media include communications media through which information is conveyed to a computer, such as through a computer or telephone network, including wireless communications networks. The latter embodiment specifically includes transmitting information to/from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a high-level block diagram of components of a massively parallel computer system 100, according to one embodiment of the present invention. Illustratively, computer system 100 shows the high-level architecture of an IBM Blue Gene® computer system, it being understood that other parallel computer systems could be used, and the description of a preferred embodiment herein is not intended to limit the present invention.

As shown, computer system 100 includes a compute core 101 having a number of compute nodes arranged in a regular array or matrix, which perform the useful work performed by system 100. The operation of computer system 100, including compute core 101, may be controlled by control subsystem 102. Various additional processors in front-end nodes 103 may perform auxiliary data processing functions, and file servers 104 provide an interface to data storage devices such as disk based storage 109A, 109B or other I/O (not shown). Functional network 105 provides the primary data communication path among compute core 101 and other system components. For example, data stored in storage devices attached to file servers 104 is loaded and stored to other system components through functional network 105.

Also as shown, compute core 101 includes I/O nodes 111A-C and compute nodes 112A-I. Compute nodes 112 provide the processing capacity of parallel system 100, and are configured to execute applications written for parallel processing. I/O nodes 111 handle I/O operations on behalf of compute nodes 112. Each I/O node 111 may include a processor and interface hardware that handles I/O operations for a set of N compute nodes 112, the I/O node and its respective set of N compute nodes are referred to as a Pset. Compute core 101 contains M Psets 115A-C, each including a single I/O node 111 and N compute nodes 112, for a total of M×N compute nodes 112. The product M×N can be very large. For example, in one implementation M=1024 (1K) and N=64, for a total of 64K compute nodes.

In general, application programming code and other data input required by compute core 101 to execute user applications, as well as data output produced by the compute core 101, is communicated over functional network 105. The compute nodes within a Pset 115 communicate with the corresponding I/O node over a corresponding local I/O tree network 113A-C. The I/O nodes, in turn, are connected to functional network 105, over which they communicate with I/O devices attached to file servers 104, or with other system components. Thus, the local I/O tree networks 113 may be viewed logically as extensions of functional network 105, and like functional network 105 are used for data I/O, although they are physically separated from functional network 105.

Control subsystem 102 directs the operation of the compute nodes 112 in compute core 101. Control subsystem 102 is a computer that includes a processor (or processors) 121, internal memory 122, and local storage 125. An attached console 107 may be used by a system administrator or similar person. Control subsystem 102 may also include an internal database which maintains state information for the compute nodes in core 101, and an application which may be configured to, among other things, control the allocation of hardware in compute core 101, direct the loading of data on compute nodes 111, and perform diagnostic and maintenance functions.

Control subsystem 102 communicates control and state information with the nodes of compute core 101 over control system network 106. Network 106 is coupled to a set of hardware controllers 108A-C. Each hardware controller communicates with the nodes of a respective Pset 115 over a corresponding local hardware control network 114A-C. The hardware controllers 108 and local hardware control networks 114 are logically an extension of control system network 106, although physically separate.

In addition to control subsystem 102, front-end nodes 103 provide computer systems used to perform auxiliary functions which, for efficiency or otherwise, are best performed outside compute core 101. Functions which involve substantial I/O operations are generally performed in the front-end nodes. For example, interactive data input, application code editing, or other user interface functions are generally handled by front-end nodes 103, as is application code compilation. Front-end nodes 103 are connected to functional network 105 and may communicate with file servers 104.

Figure 2:
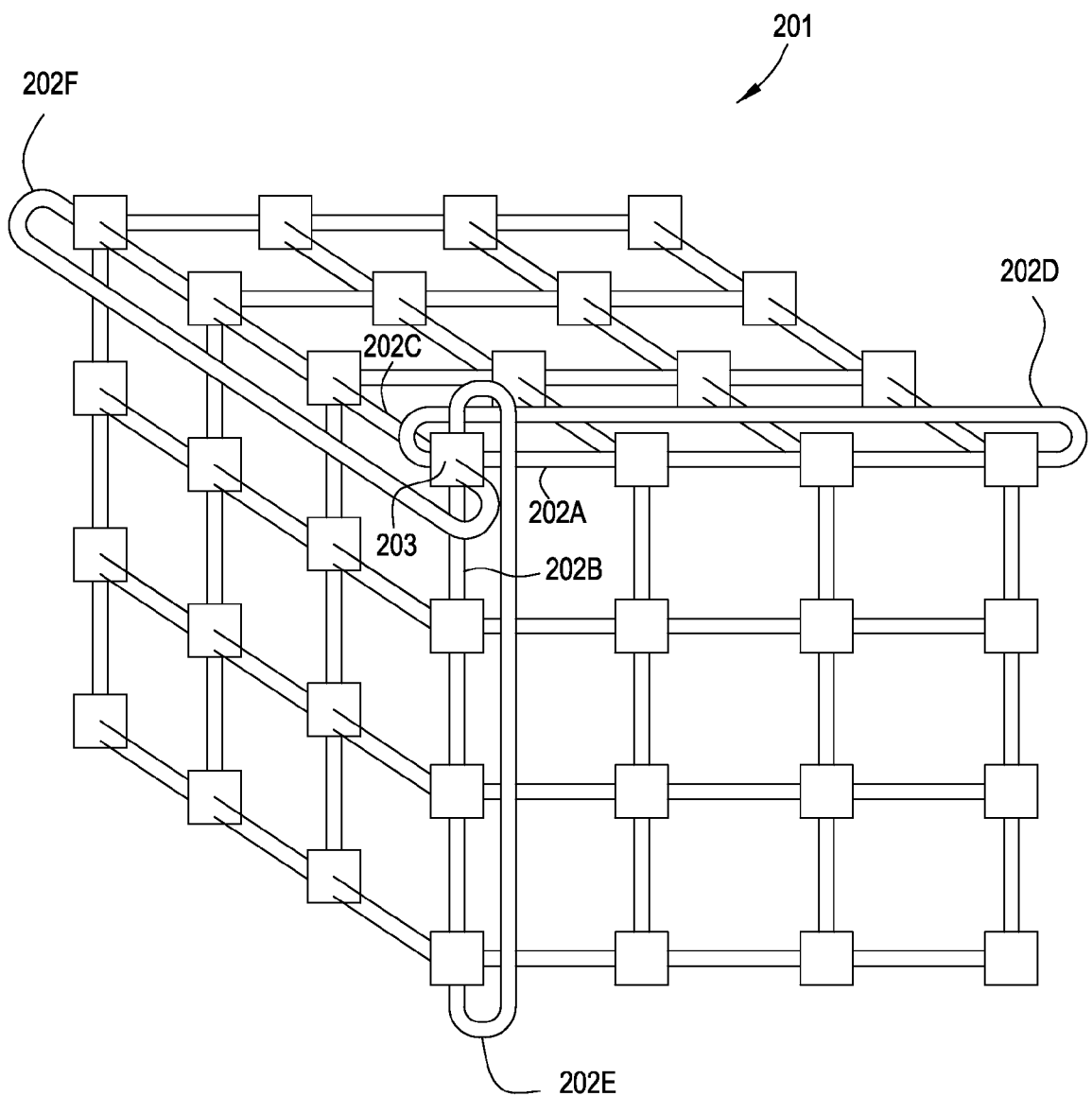
FIG. 2 is a conceptual illustration of a three-dimensional torus network of the system of FIG. 1, according to one embodiment of the invention.

In one embodiment, compute nodes 112 are arranged logically in a three-dimensional torus, where each compute node 112 may be identified using an x, y and z coordinate. FIG. 2 is a conceptual illustration of a three-dimensional torus network of system 100, according to one embodiment of the invention. More specifically, FIG. 2 illustrates a 4×4×4 torus 201 of compute nodes, in which the interior nodes are omitted for clarity. Although FIG. 2 shows a 4×4×4 torus having 64 nodes, it will be understood that the actual number of compute nodes in a parallel computing system is typically much larger. For example, a complete Blue Gene/L system includes 65,536 compute nodes. Each compute node 112 in torus 201 includes a set of six node-to-node communication links 202A-F which allows each compute nodes in torus 201 to communicate with its six immediate neighbors, two nodes in each of the x, y and z coordinate dimensions.

As used herein, the term "torus" includes any regular pattern of nodes and inter-nodal data communications paths in more than one dimension, such that each node has a defined set of neighbors, and for any given node, it is possible to determine the set of neighbors of that node. A "neighbor" of a given node is any node which is linked to the given node by a direct inter-nodal data communications path. That is, a path which does not have to traverse another node. The compute nodes may be linked in a three-dimensional torus 201, as shown in FIG. 2, but may also be configured to have more or fewer dimensions. Also, it is not necessarily the case that a given node's neighbors are the physically closest nodes to the given node, although it is generally desirable to arrange the nodes in such a manner, insofar as possible.

In one embodiment, the compute nodes in any one of the x, y, or z dimensions form a torus in that dimension because the point-to-point communication links logically wrap around. For example, this is represented in FIG. 2 by links 202D, 202E, and 202F which wrap around from a last node in the x, y and z dimensions to a first node. Thus, although node 203 appears to be at a "corner" of the torus, node-to-node links 202A-F link node 203 to nodes 202D, 202E, and 202F, in the x, y, and Z dimensions of torus 201.

By passing a message from node to node, each compute node can send a message to any other node across a 3D torus network. Generally, message packets may be deterministically routed or dynamically routed. When a node sends a packet using a deterministic routing strategy, the packet is routed to the correct x dimension, then the correct y dimension, and lastly the correct z dimension. In other words, the routing path between any two nodes will always follow the same static route. Thus, packets are assured to arrive in order at a destination node. In contrast, when a node sends a packet using a dynamic routing strategy, a determination is made at each compute node between the source and destination regarding which path to transmit the packet. Generally, packets are routed so that they travel down the least congested network path from any given node. Thus, packets may arrive at the destination node out of order when network activity changes as a message is being sent.

Figure 3:
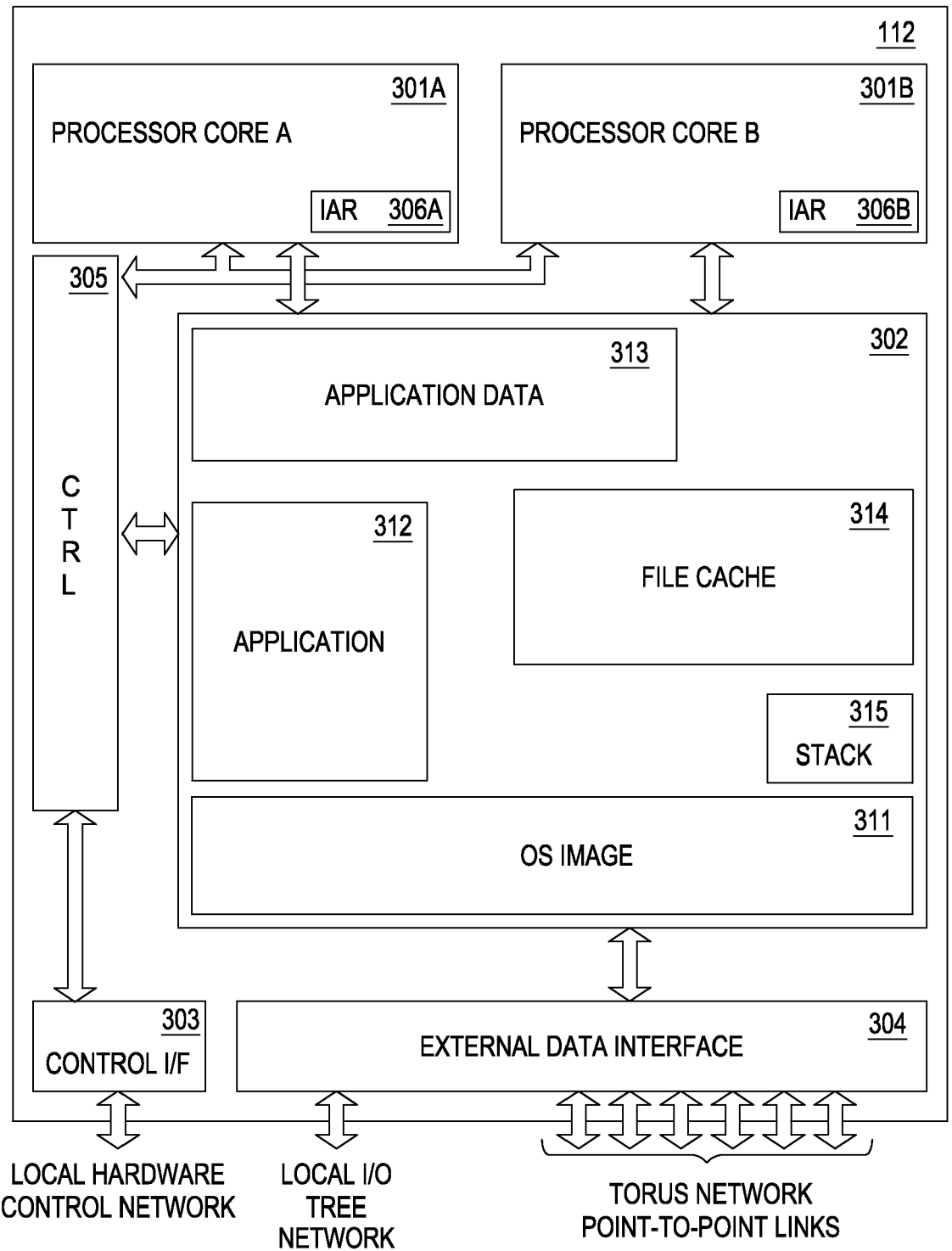
FIG. 3 is a high-level diagram of a compute node of the system of FIG. 1, according to one embodiment of the invention.

FIG. 3 is a high-level diagram of a compute node 112 of the system 100 of FIG. 1, according to one embodiment of the invention. As shown, compute node 112 includes processor cores 301A and 301B, and also includes memory 302 used by both processor cores 301; an external control interface 303 which is coupled to local hardware control network 114; an external data communications interface 304 which is coupled to the corresponding local I/O tree network 113, and the corresponding six node-to-node links 202 of the torus network 201; and monitoring and control logic 305 which receives and responds to control commands received through external control interface 303. Monitoring and control logic 305 may access processor cores 301 and locations in memory 302 on behalf of control subsystem 102 to read (or in some cases alter) the operational state of node 112. In one embodiment, each node 112 may be physically implemented as a single, discrete integrated circuit chip.

As described, functional network 105 may service many I/O nodes, and each I/O node is shared by multiple compute nodes 112. Thus, it is apparent that the I/O resources of parallel system 100 are relatively sparse when compared to computing resources. Although it is a general purpose computing machine, parallel system 100 is designed for maximum efficiency in applications which are computationally intense.

As shown in FIG. 3, memory 302 stores an operating system image 311, an application code image 312, and user application data structures 313 as required. Some portion of memory 302 may be allocated as a file cache 314, i.e., a cache of data read from or to be written to an I/O file. Operating system image 311 provides a copy of a simplified-function operating system running on compute node 112. Operating system image 311 may includes a minimal set of functions required to support operation of the compute node 112. In a Blue Gene system, for example, operating system image 311 contains a version of the Linux® operating system customized to run on compute node 112. Of course, other operating systems may be used, and further it is not necessary that all nodes employ the same operating system. (Also note, Linux® is a registered trademark of Linus Torvalds in the United States and other countries.)

Application code image 312 represents a copy of the application code being executed by compute node 112. Application code image 302 may include a copy of a computer program being executed by system 100, but where the program is very large and complex, it may be subdivided into portions which are executed by different compute nodes 112. Memory 302 may also include a call-return stack 315 for storing the states of procedures which must be returned to, which is shown separate from application code image 302, although it may be considered part of application code state data.

As part of ongoing operations, application 312 may be configured to transmit messages from compute node 112 to other compute nodes in parallel system 100. For example, the high level MPI call of MPI_Send( ); may be used by application 312 to transmit a message from one compute node to another. On the other side of the communication, the receiving node may call use the MPI call MPI_Recieve( ); to receive and process the message. As described above, in a Blue Gene system, the external data interface 304 may be configured to transmit the high level MPI message by encapsulating it within a set of packets and transmitting the packets of over the torus network of point-to-point links. Other parallel systems also include a mechanism for transmitting messages between different compute nodes. For example, nodes in a Beowulf cluster may communicate using a using a high-speed Ethernet style network.

Figure 4:
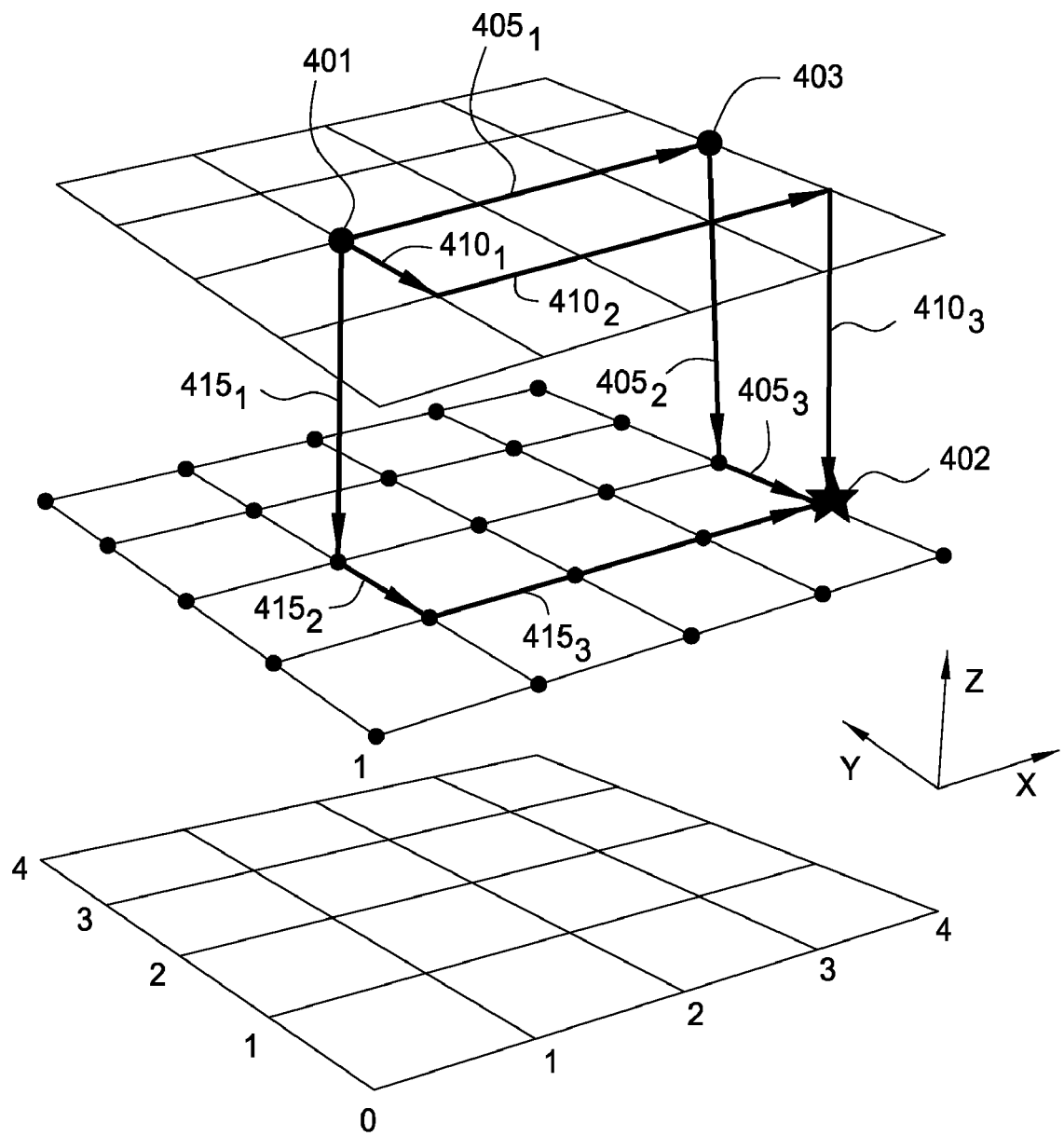
FIG. 4 is a conceptual illustration of multiple routing paths used to transmit a message from a source node to a destination node in a parallel computing system, according to one embodiment of the invention.
Figure 4:
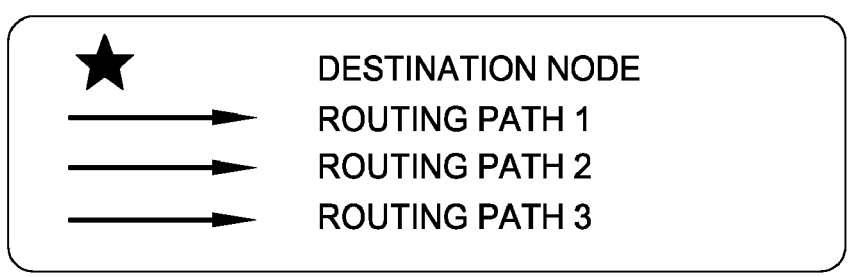

FIG. 4 is a conceptual illustration of multiple routing paths used to transmit a message from a source node 401 to a destination node 402 in a parallel computing system, according to one embodiment of the invention. In one embodiment, packets may be injected onto a network along multiple network dimensions. For example, FIG. 4 shows a message transmitted from source node 401 to destination node 402. In this example, network packets are injected onto network 400 along three planes, specifically, an x-plane, a y-plane, and a z-plane. Accordingly, three routing paths are shown between source node 401 and destination node 402. First, a path initiated on the x-plane includes segments $405_1$, $405_2$, and $405_3$. Second, a path initiated on the y-plane includes segments $410_1$, $410_2$, and $410_3$. And third, a path initiated on the z-plane includes segments $415_1$, $415_2$, and $415_3$. By injecting messages onto network 400 along each of the x-plane, the y-plane, and the z-plane, message bandwidth can be substantially increased.

The number of network dimensions used to transmit a message may depend upon the configuration of the network linking the compute nodes of a parallel system. For example, the torus network of a Blue Gene system links compute nodes in three dimensions, and thus messages packets may be transmitted along an x-plane, a y-plane, and a z-plane. Using all three network planes to transmit a message may nearly triple the available bandwidth of message passing on the torus network. Of course, other network configurations for the compute nodes of a parallel computer system may include more, or fewer, network dimensions.

Additionally, the relative locations of the source and destination nodes may affect the number of network dimensions used to transmit a given message. For example, the torus networks illustrated in FIG. 2 and FIG. 4 show a three dimensional torus network. If the source node and destination node are on the same axis, i.e, if the nodes positions are different in only one dimensional coordinate, then packets injected onto the torus network traverse only along that axis. For example, consider a message passed from node 401 to node 403 (i.e., a message from the node at <1, 2, 3> to the node at <3, 2, 3>). To pass a message between these nodes only the x-axis needs to be traversed. Accordingly, packets transmitting a message are routed along only this path. Much more frequently, however, the relative positions of a source and destination node will be different in multiple dimensions. In such a case, message packets may be transmitted essentially simultaneously in multiple network dimensions, as is illustrated by routing paths $405_{1-3}$, $410_{1-3}$, and $415_{1-3}$ in FIG. 4.

Figure 5:
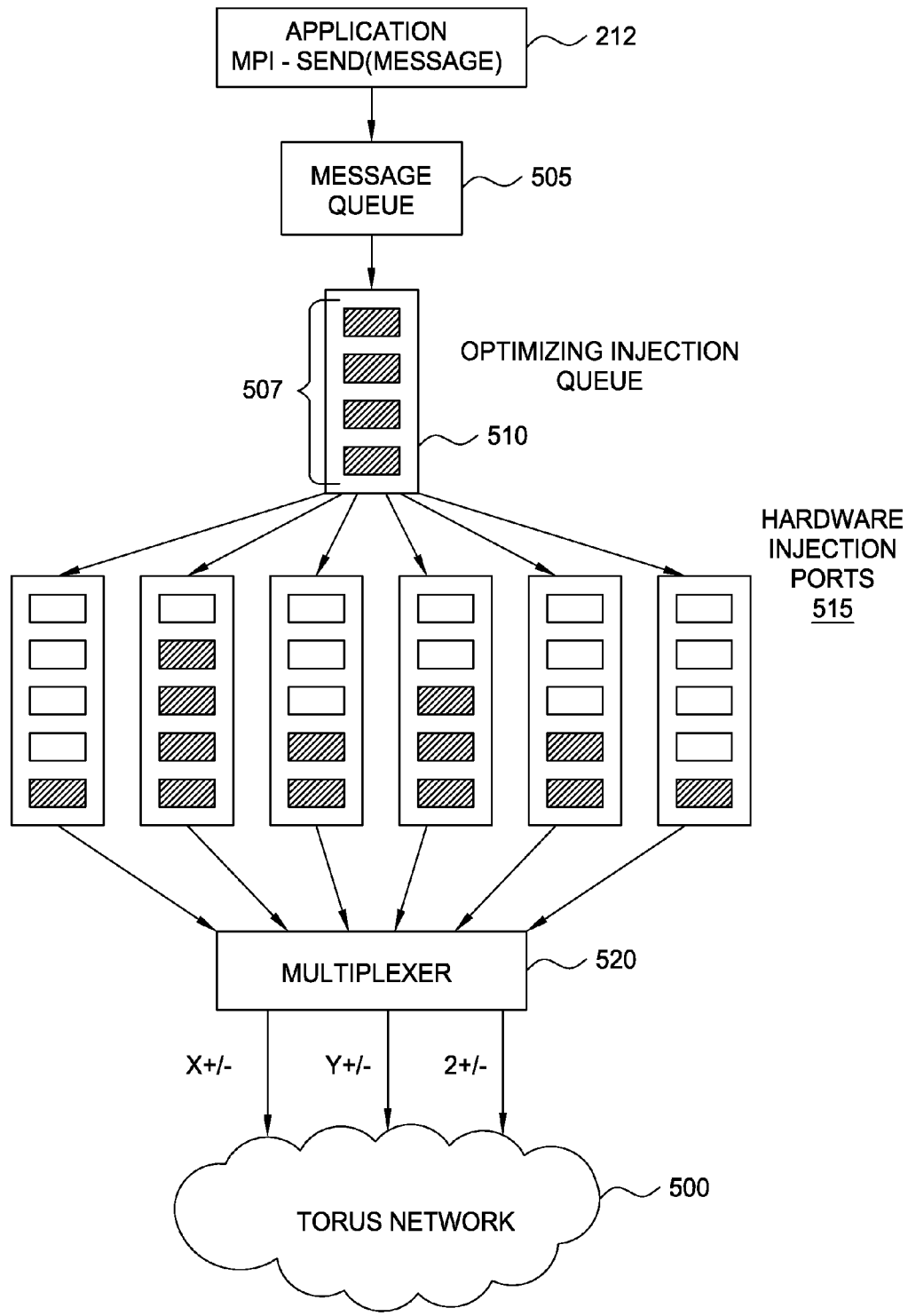
FIG. 5 is a conceptual illustration of an opportunistic queue used to transmit a message from a source node to a destination node in a parallel computing system, according to one embodiment of the invention.

FIG. 5 is a conceptual illustration of an opportunistic queue being used to transmit a message from a source node to a destination node in a parallel computing system, according to one embodiment of the invention. As shown, application 212 (running on a compute node 112 of parallel computer system) calls the MPI function MPI_Send( ) to send a message from a source compute node to a destination compute node. Of course, other message passing interfaces may be used to exchange messages between compute nodes of a parallel system.

In one embodiment, the message is transmitted using communication links connecting compute nodes of a parallel system. As described above, a parallel system may include a large number of compute nodes, and each node may include communication links to other nodes. For example, each compute node 112 in a Blue Gene system is connected to its six nearest neighbors. That is, each compute node 112 is connected to an x+ and x− node, a y+ and y− node, and a z+ and z− node of the torus network.

Message queue 505 may be configured to receive the message from application 212 and to encapsulate the message into a set of packets 507 (represented in FIG. 5 as the solid boxes). In one embodiment, the message is broken into two parts, a protocol part, that contains less data payload, but more self describing data, and a data part, which contains packets that can be injected onto the network in any order and arrive at the destination node in any order. The packet structure may depend on the particular parallel computer system and network architecture. As defined for the Blue Gene system, for example data packets transmitted over the point-to-point links of the torus network may store a maximum of 256 bytes. The data packets may include a maximum payload of 240 bytes and 16 bytes of header and protocol data (e.g., source address, destination address, message ID, packet sequence, etc). Of course, in other communication schemes the maximum packet size, as well as the exact allocation of bytes between headers, message metadata, and payload data may vary.

The resulting packets may me be supplied to an opportunistic injection queue 510. In one embodiment, injection queue 510 may be configured to pass the packets into one or more hardware injection ports 515. Each hardware injection port may provide a first-in-first-out (fifo) mechanism for injecting packets onto the point-to-point network linking compute nodes of a parallel system. That is, hardware injection ports 515 may be configured to drain packets onto network 500 in the same order in which the packets are received.

In one embodiment, each hardware injection port 515 may be associated with a different communication link or path. For example, on a Blue Gene system, the x+/−, y+/−, and z+/− communication links each have a hardware injection port. Multiplexer 520 may be configured to drain packets from injection 515 and pass them onto the communication links of a torus network 500.

Figure 6:
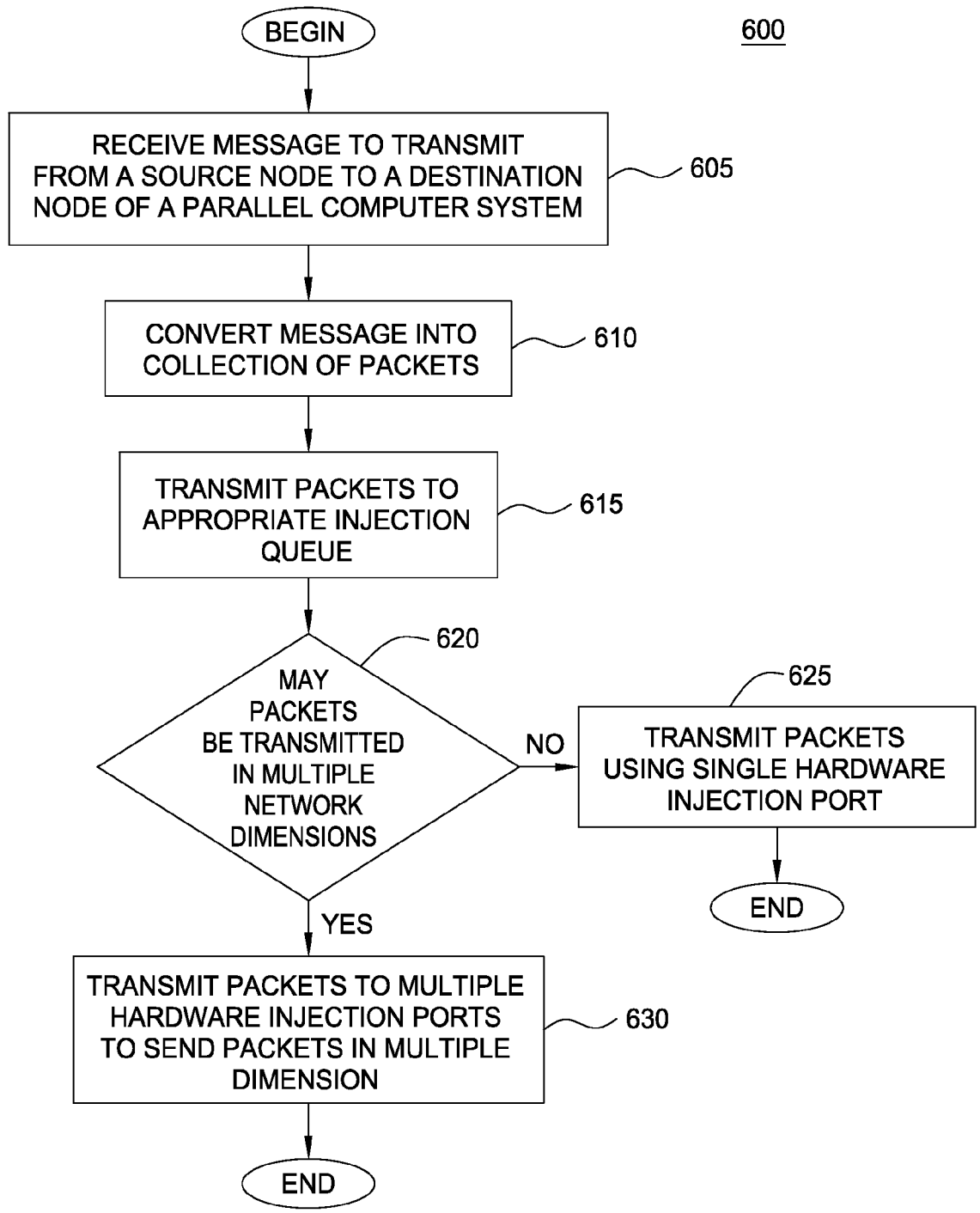
FIG. 6 is a flow diagram illustration a method for transmitting messages from a source node to a destination node in a parallel computing system, according to one embodiment of the invention.

FIG. 6 is a flow diagram illustration a method for transmitting messages from a source node to a destination node in a parallel computing system. In one embodiment, the method 600 may be used to encapsulate and transmit application program messages (e.g., MPI messages) between compute nodes of a massively parallel computer system.

As shown, the method 605 begins at step 605, where a message queue receives a message to transmit from the source node to the destination node of a parallel system. At step 610, the message queue may be configured to encapsulate the message into a sequence of packets. At step 615, the message packets are transmitted to an opportunistic injection queue. In one embodiment, the injection queue may store the packets and distribute them to one or more hardware injection ports. As stated, each hardware injection port may be configured to inject the packets onto the network along a different network link or dimension.

At step 620, the opportunistic injection queue may determine whether the message packets may be transmitted using multiple network dimensions. If not, then at step 625, the message packets may be transmitted to a single hardware injection port. Thereafter, the packets are drained onto the communication link associated with that network, and may then be transmitted in order (using deterministic routing) or out-of order (using adaptive routing) from the transmitting injection port to the destination node. This approach may be used where message packets need to be transmitted in order. In such a case, the packets may be transmitted using a single hardware injection port, and the packets may be routed deterministically. Or in another case, the source and destination may fall along a natural network axis, and the message packets may be transmitted to the injection port corresponding to that axis.

Otherwise, where message packets may be transmitted in multiple network dimensions, at step 630, the opportunistic injection queue may transmit the packets to multiple hardware injection ports, leading to packets being transmitted from the source node along multiple dimensions essentially simultaneously.

Advantageously, transmitting network packets using multiple network dimensions allows for complete network link saturation. In a parallel system with multiple network dimensions, sending message packets using each dimension may substantially increase network throughput. For example, for a source node and destination node lying in the same plane, message packets may be injected onto the network essentially simultaneously using two injection ports, effectively doubling the bandwidth of a point-to-point network of a parallel computer system. And, as is often the case, for a source node and a destination node lying in different planes, message packets may be injected onto the network essentially simultaneously using two injection ports effectively tripling the bandwidth of a point-to-point network of a parallel computer system. Although this approach may result in message packets arriving at the receiving node out-of-order, the additional overhead incurred by the receiving node in re-ordering the message is more then compensated for by the increase in bandwidth achieved by using multiple injection ports.

While the foregoing is directed to embodiments of the present invention, other and further embodiments of the invention may be devised without departing from the basic scope thereof, and the scope thereof is determined by the claims that follow.

What is claimed is:

1. A method of transmitting a message between a sending node and a receiving node of a parallel computing system, comprising:
   encapsulating the message in a set of one or more data packets;
   determining in how many network dimensions to transmit the set of data packets from the sending node to the receiving node based on relative positions of the receiving node and the sending node in the parallel computing system and a load of at least one network dimension;
   transmitting the set of data packets from an injection queue to a plurality of hardware injection ports, wherein each hardware injection port is associated with a different communication link of the parallel computing system, and wherein each communication link of the sending node links the sending node to other nodes of the parallel computing system in a different network dimension of the multiple network dimensions; and
   injecting the set of data packets onto the different communication links of the sending node.

2. The method of claim 1, wherein the compute nodes of the parallel computing system are linked using a plurality of point-to-point links.

3. The method of claim 2, wherein the plurality of point-to-point links forms a multi-dimensional torus.

4. The method of claim 1, wherein the sending node and the receiving node are in a same network plane, and wherein the set of data packets are transmitted from the sending node over communication links in two dimensions.

5. The method of claim 1, wherein the sending node and the receiving node are in different network planes, and wherein the set of data packets are transmitted from the sending node over communication links in three dimensions.

6. The method of claim 1, wherein the message is constructed according to the message passing interface (MPI) specification.

7. The method of claim 1, wherein the set of data packets arrive at the receiving node out of sequence, and wherein the receiving node is configured to reconstruct the message from the set of data packets.

8. A non-transitory computer-readable storage medium containing a program which, when executed, performs an operation of transmitting a message between a sending node and a receiving node of a parallel computing system, comprising:
   encapsulating the message in a set of one or more data packets;
   determining in how many network dimensions to transmit the set of data packets from the sending node to the receiving node based on relative positions of the receiving node and the sending node in the parallel computing system and a load of at least one network dimension;
   transmitting the set of data packets from an injection queue to a plurality of hardware injection ports, wherein each hardware injection port is associated with a different communication link of the parallel computing system, and wherein each communication link of the sending node links the sending node to other nodes of the parallel computing system in a different network dimension of the multiple network dimensions; and
   injecting the set of data packets onto the different communication links of the sending node.

9. The non-transitory computer-readable storage medium of claim 8, wherein the compute nodes of the parallel computing system are linked using a plurality of point-to-point links.

10. The non-transitory computer-readable storage medium of claim 9, wherein the plurality of point-to-point links forms a multi-dimensional torus.

11. The non-transitory computer-readable storage medium of claim 8, wherein the sending node and the receiving node are in a same network plane, and wherein the set of data packets are transmitted from the sending node over communication links in two dimensions.

12. The non-transitory computer-readable storage medium of claim 8, wherein the sending node and the receiving node are in different network planes, and wherein the set of data packets are transmitted from the sending node over communication links in three dimensions.

13. The non-transitory computer-readable storage medium of claim 8, wherein the message is constructed according to the message passing interface (MPI) specification.

14. The non-transitory computer-readable storage medium of claim 8, wherein the set of data packets arrive at the receiving node out of sequence, and wherein the receiving node is configured to reconstruct the message from the set of data packets.

15. A parallel computing system, comprising:
   a plurality of compute nodes, each having at least:
      a processor; and
      a memory;
   wherein a sending node, of the plurality of compute nodes, is configured to transmit a message to a receiving node, of the plurality of compute nodes, by:
      generating a message to transmit from a sending node to a receiving node, of the encapsulating the message in a set of one or more data packets,
      determining in how many network dimensions in which to transmit the set of data packets from the sending node to the receiving node based on relative positions of the receiving node and the sending node in the parallel computing system and a load of at least one network dimension;
      transmitting the set of data packets from an injection queue to a plurality of hardware injection ports, wherein each hardware injection port is associated with a different communication link of the parallel computing system, and wherein each communication link of the sending node links the sending node to other nodes of the parallel computing system in a different network dimension of the multiple network dimensions; and
      injecting the set of data packets onto the different communication links of the sending node.

16. The system of claim 15, wherein the compute nodes of the parallel computing system are linked using a plurality of point-to-point links.

17. The system of claim 16, wherein the plurality of point-to-point links forms a multi-dimensional torus.

18. The system of claim 15, wherein the sending node and the receiving node are in a same network plane, and wherein the set of data packets are transmitted from the sending node over communication links in two dimensions.

19. The system of claim 15, wherein the sending node and the receiving node are in different network planes, and wherein the set of data packets are transmitted from the sending node over communication links in three dimensions.

20. The system of claim 15, wherein the message is constructed according to the message passing interface (MPI) specification.

21. The system of claim 15, wherein the set of data packets arrive at the receiving node out of sequence, and wherein the receiving node is configured to reconstruct the message from the set of data packets.

* * * * *